United States Patent
Lin et al.

(10) Patent No.: US 10,768,474 B2
(45) Date of Patent: Sep. 8, 2020

(54) DISPLAY PANEL

(71) Applicant: Au Optronics Corporation, Hsinchu (TW)

(72) Inventors: Szu-Yen Lin, Taipei (TW); Yao-An Hsieh, New Taipei (TW); Hsin-Chun Huang, Hsinchu County (TW); Wen-Rei Guo, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/051,515

(22) Filed: Aug. 1, 2018

(65) Prior Publication Data

US 2019/0086721 A1     Mar. 21, 2019

(30) Foreign Application Priority Data

Sep. 21, 2017   (TW) .............................. 106132400 A

(51) Int. Cl.
*G02F 1/1335* (2006.01)
*G02F 1/1337* (2006.01)
*G02F 1/13363* (2006.01)

(52) U.S. Cl.
CPC ...... *G02F 1/133528* (2013.01); *G02F 1/1337* (2013.01); *G02F 1/13363* (2013.01); *G02F 1/133514* (2013.01); *G02F 1/133555* (2013.01); *G02F 2001/133531* (2013.01);
(Continued)

(58) Field of Classification Search
CPC ......... G02F 1/133528; G02F 1/133555; G02F 1/13363; G02F 1/133514; G02F 1/1337; G02F 2001/133538; G02F 2001/133548; G02F 2001/133531; G02F 2001/133638
See application file for complete search history.

(56) References Cited

U.S. PATENT DOCUMENTS

| 10,324,332 B2 | 6/2019 | Wang |
| 2005/0270449 A1* | 12/2005 | Koma ............... G02F 1/133371 349/114 |
| 2007/0019292 A1 | 1/2007 | Kim et al. |

(Continued)

FOREIGN PATENT DOCUMENTS

| CN | 1564059 | 1/2005 |
| CN | 1700066 | 11/2005 |

(Continued)

*Primary Examiner* — Phu Vu
(74) *Attorney, Agent, or Firm* — JCIPRNET

(57) ABSTRACT

A display panel includes an active device substrate, an opposite substrate, a liquid crystal layer, a color filter layer, and a first polarized pattern layer. The color filter layer includes a first filter pattern, a second filter pattern, and a third filter pattern. The first polarized pattern layer includes a first upper polarized pattern, a second upper polarized pattern, and a third upper polarized pattern. The first upper polarized pattern is disposed in correspondence to the first filter pattern and includes a plurality of metal wires arranged along a first direction. The second upper polarized pattern is disposed in correspondence to the second filter pattern and includes a plurality of metal wires arranged along a second direction. The third upper polarized pattern is disposed in correspondence to the third filter pattern and includes a plurality of metal wires arranged along a third direction.

16 Claims, 6 Drawing Sheets

(52) U.S. Cl.
CPC ............ *G02F 2001/133538* (2013.01); *G02F 2001/133548* (2013.01); *G02F 2001/133638* (2013.01)

(56) References Cited

U.S. PATENT DOCUMENTS

| | | | |
|---|---|---|---|
| 2013/0033662 A1 | 2/2013 | Chung et al. | |
| 2013/0201557 A1* | 8/2013 | Davis | G02B 5/3058 359/486.01 |
| 2016/0238884 A1 | 8/2016 | Zhang et al. | |
| 2018/0275459 A1* | 9/2018 | Wang | G02F 1/133528 |

FOREIGN PATENT DOCUMENTS

| | | |
|---|---|---|
| CN | 102914917 | 2/2013 |
| CN | 105700224 | 6/2016 |
| CN | 106249336 | 12/2016 |
| CN | 106249337 | 12/2016 |
| TW | 201025230 | 7/2010 |

* cited by examiner

DISPLAY PANEL

CROSS-REFERENCE TO RELATED APPLICATION

This application claims the priority benefit of Taiwan application serial no. 106132400, filed on Sep. 21, 2017. The entirety of the above-mentioned patent application is hereby incorporated by reference herein and made a part of this specification.

BACKGROUND OF THE INVENTION

Field of the Invention

The invention relates to a display panel, and more particularly, to a display panel having a first polarized pattern, a second polarized pattern, and a third polarized pattern.

Description of Related Art

A liquid crystal display panel is generally provided with a polarizer on both the upper and lower substrates. The polarizer absorption axis of the upper substrate and the polarizer absorption axis of the lower substrate are perpendicular to each other, and since only light perpendicular to the polarizer absorption axis can pass through the polarizer. Therefore, liquid crystals between the upper and lower polarizers can be rotated to control whether or not light can pass through.

Currently, the polarizers are entirely adhered on the same display panel, and the absorption axes of the polarizers corresponding to different color filter patterns are in the same direction. However, phase difference exists for lights of different wavelengths, and light leakage readily occurs to lights having shorter wavebands or lights having longer wavebands. As a result, the quality of the display panel in dark state is poor, such as the display panel tends to appear blueish in dark state. Therefore, a method for solving the above issues is urgently needed.

SUMMARY OF THE INVENTION

The invention provides a display panel with improved contrast between lights of different wavebands and better dark state quality.

The display panel of the invention includes an active device substrate, an opposite substrate, a liquid crystal layer, a color filter layer, and a first polarized pattern layer. The opposite substrate is disposed opposite to the active device substrate. The liquid crystal layer is disposed between the active device substrate and the opposite substrate. The color filter layer is disposed between the active device substrate and the opposite substrate. The color filter layer includes a first filter pattern, a second filter pattern, and a third filter pattern. The first polarized pattern layer is located on the color filter layer. The first polarized pattern layer includes a first upper polarized pattern, a second upper polarized pattern, and a third upper polarized pattern. The first upper polarized pattern is disposed in correspondence to the first filter pattern and includes a plurality of metal wires arranged along a first direction. The second upper polarized pattern is disposed in correspondence to the second filter pattern and includes a plurality of metal wires arranged along a second direction. The third upper polarized pattern is disposed in correspondence to the third filter pattern and includes a plurality of metal wires arranged along a third direction. The first direction, the second direction, and the third direction are not the same direction.

Based on the above, the display panel of the invention has a first upper polarized pattern, a second upper polarized pattern, and a third upper polarized pattern. The first upper polarized pattern, the second upper polarized pattern, and the third upper polarized pattern include two or more absorption axes of different directions, and therefore the contrast between lights of different wavebands can be increased and dark state quality of the display panel can be improved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
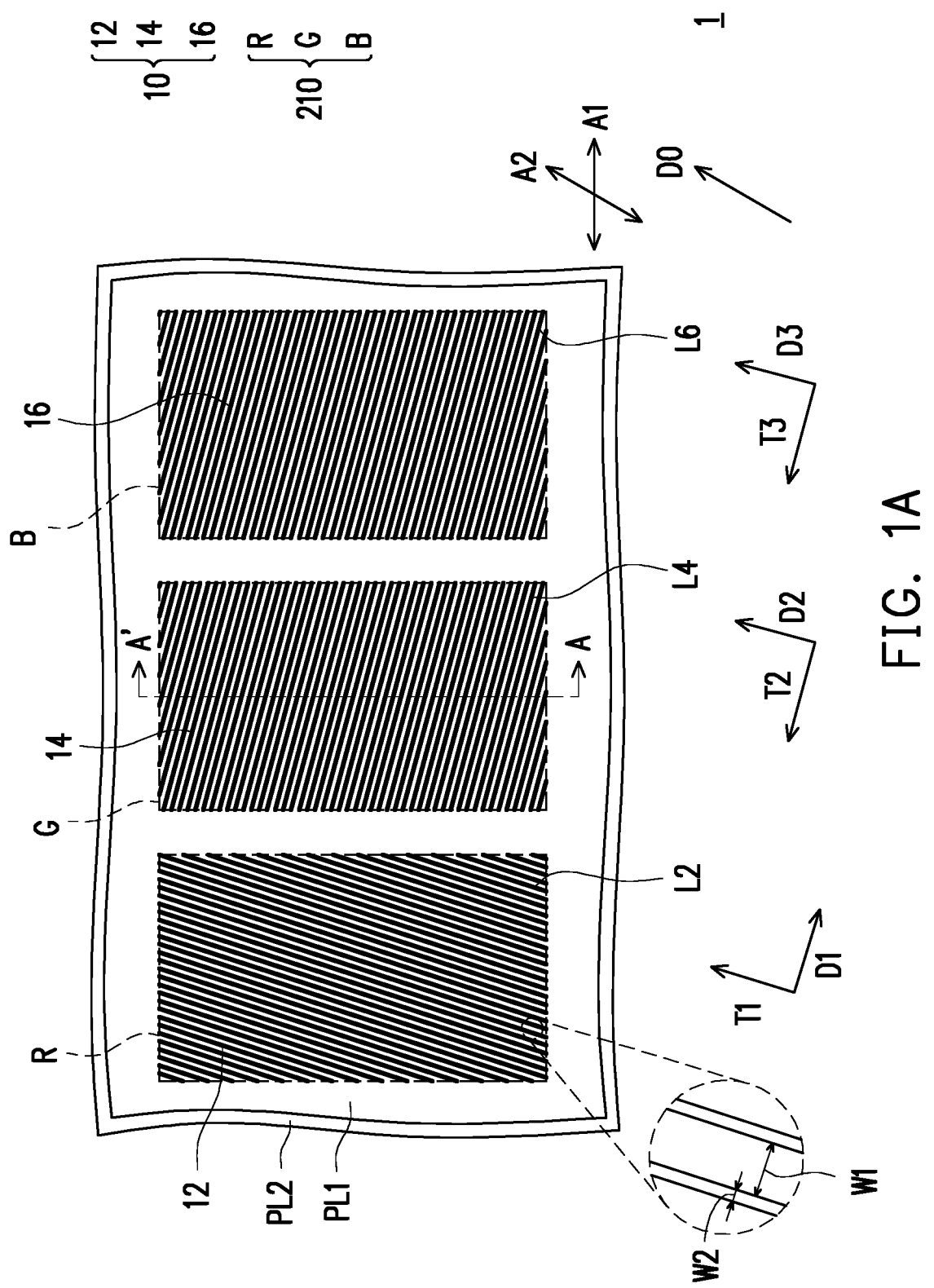
FIG. 1A is a top view of a display panel according to an embodiment of the invention.
Figure 1B:
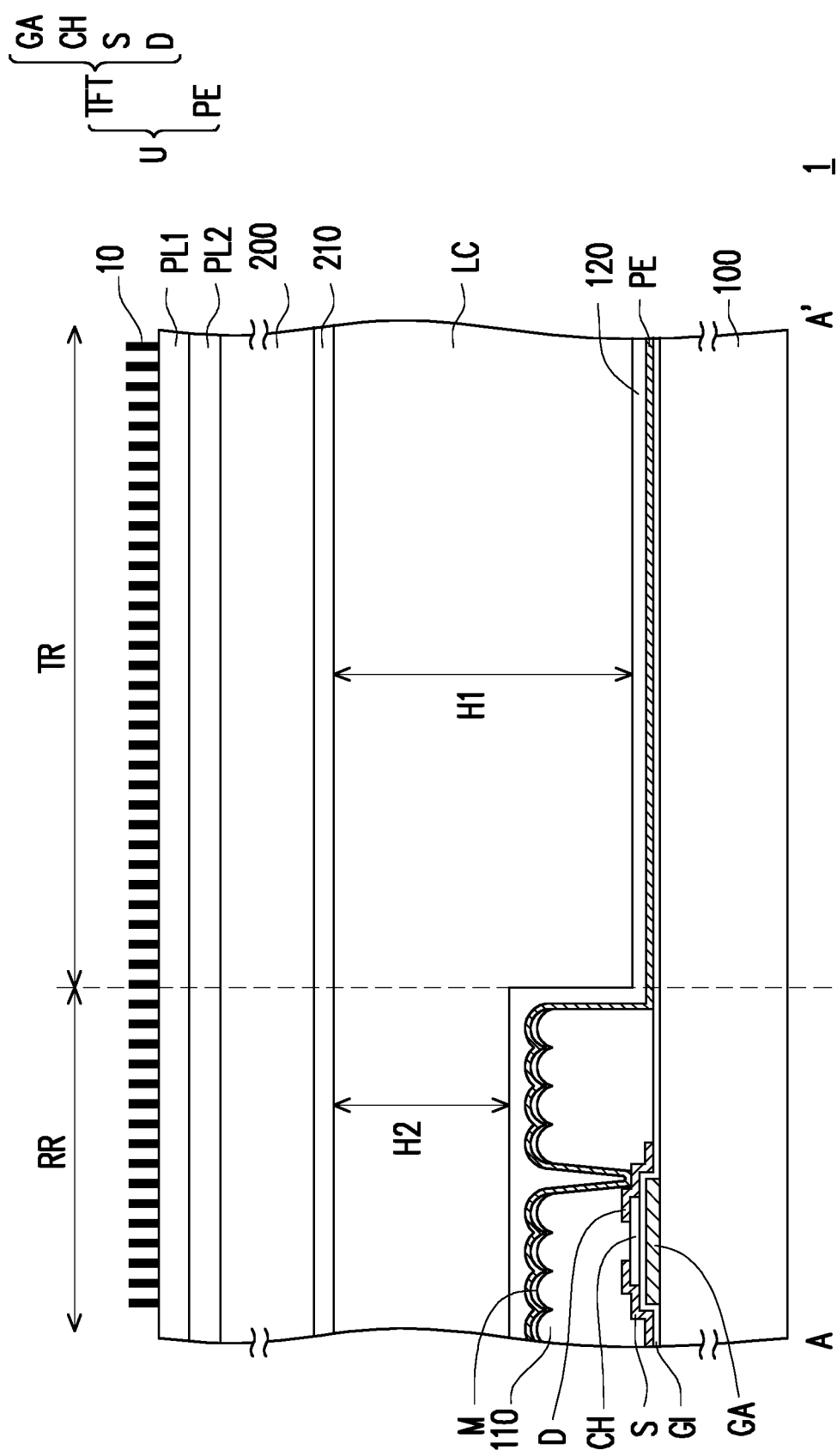
FIG. 1B is a cross section along section line AA' of FIG. 1A.

FIG. 1A is a top view of a display panel according to an embodiment of the invention. FIG. 1B is a cross section along section line AA' of FIG. 1A.

Referring to both FIG. 1A and FIG. 1B, a display panel 1 includes an active device substrate 100, an opposite substrate 200, a liquid crystal layer LC, a color filter layer 210, and a first polarized pattern layer 10.

The material of the active device substrate 100 can be glass, quartz, organic polymer, or an opaque/reflective material (such as conductive material, metal, wafer, ceramic, or other suitable materials), or other suitable materials. If a conductive material or metal is used, then an insulating layer (not shown) is provided on the active device substrate 100 to prevent short circuits.

In an embodiment, the active device substrate 100 includes a plurality of scan lines, a plurality of data lines, and a plurality of sub-pixels U. In the present embodiment, the display panel 1 is a transflective display panel and at least a portion of each of the sub-pixels U has a reflective region RR and a transmission region TR adjacent to the reflective region RR, but the invention is not limited thereto. In other embodiments, the display panel is a total-reflection display panel, and the sub-pixels may not include a transmission region.

In an embodiment, the sub-pixels U include an active device TFT and a pixel electrode PE electrically connected to the active device TFT. The active device TFT is, for instance, located in the reflective region RR and includes a gate GA, a channel layer CH, a source S, and a drain D.

The gate GA is electrically connected to a scan line (not shown). A gate insulating layer GI is disposed between the channel layer CH and the gate GA. The channel layer CH is a single layer or a multilayer structure and contains amorphous silicon, polysilicon, microcrystalline silicon, single-crystal silicon, organic semiconductor material, oxide semiconductor material (such as indium zinc oxide, indium gallium zinc oxide, other suitable materials, or a combination thereof), other suitable materials, above mentioned materials with dopant, or a combination thereof. The present embodiment is exemplified by a bottom gate structure, but the invention is not limited thereto, and in other embodiments, a top gate structure or a double gate structure . . . etc. can also be used.

The source S is electrically connected to a data line (not shown) and the channel layer CH. The drain D is electrically connected to the channel layer CH and the pixel electrode PE.

The insulating layer 110 is located in the reflective region RR and covers the active device TFT. In an embodiment, the surface of the insulating layer 110 has an uneven structure. In an embodiment, a reflective layer M is further formed on the insulating layer 110 to form an uneven reflective structure, and the material of the reflective layer M includes, for instance, a metal material. In an embodiment, the pixel electrode PE is electrically connected to the drain D via an opening of the insulating layer 110. In an embodiment, the pixel electrode PE is extended from the reflective region RR to the transmission region TR.

The alignment layer 120 is located on the active device substrate 100. The alignment layer 120 for instance, covers the pixel electrode PE. In an embodiment, the material of the alignment layer 120 includes polyimide (PI) or other suitable materials. In an embodiment, the alignment layer 120 is provided with an alignment direction D0 by, for instance, physical alignment, optical alignment, or chemical alignment.

The liquid crystal layer LC is disposed between the active device substrate 100 and the opposite substrate 200. The liquid crystal layer LC can include a positive type liquid crystal, a negative type liquid crystal, or other suitable media. The display medium in the following embodiments of the invention is exemplified by a liquid crystal, but the invention is not limited thereto. Moreover, the liquid crystal layer in the following embodiments of the invention preferably can be rotated or switched by a horizontal electric field or rotated or switched by a vertical electric field, but the invention is not limited thereto. The arrangement direction of the liquid crystal molecule in the liquid crystal layer LC corresponds to the alignment direction D0 of the alignment layer 120.

In an embodiment, a first gap H1 of the liquid crystal layer LC is between the transmission region TR of the sub-pixels U and the opposite substrate 200, a second gap H2 of the liquid crystal layer LC is between the reflective region RR of the sub-pixels U and the opposite substrate 200, and the first gap H1 is greater than the second gap H2. In an embodiment, the first gap H1 is substantially equal to twice the second gap H2.

The opposite substrate 200 is disposed opposite to the active device substrate 100. The color filter layer 210 is disposed between the active device substrate 100 and the opposite substrate 200. In the present embodiment, the color filter layer 210 is disposed on the opposite substrate 200, and the color filter layer 210 is located between the opposite substrate 200 and the liquid crystal layer LC, but the invention is not limited thereto. In some embodiments, the color filter layer 210 is located between the liquid crystal layer LC and the active device substrate 100.

The color filter layer 210 includes a first filter pattern R, a second filter pattern G, and a third filter pattern B respectively corresponding to different sub-pixels U. In an embodiment, the first filter pattern R is a red filter pattern, the second filter pattern G is a green filter pattern, and the third filter pattern B is a blue filter pattern. Although only three different filter patterns are shown in the present embodiment, the invention is not limited thereto. In other embodiments, the color filter layer 210 can further include filter patterns of other colors, such as a white filter pattern. In the present embodiment, the shapes of the first filter pattern R, the second filter pattern G, and the third filter pattern B in the color filter pattern 210 are rectangular, but the invention is not limited thereto, and in other embodiments, the shape of the first filter pattern R, the second filter pattern G, and the third filter pattern B can be other geometric shapes, and the shapes of the first filter pattern R, the second filter pattern G, and the third filter pattern B can be different. In some embodiments, the opposite substrate 200 can further include a black matrix (not shown) surrounding the first filter pattern R, the second filter pattern G, and the third filter pattern B to alleviate the issue of color shift of the display panel.

The first optical film PL1 is, for instance, a λ/2 wave plate located at a side of the opposite substrate 200 opposite to the liquid crystal layer LC. The second optical film PL2 is, for instance, a λ/4 wave plate located between the first optical film PL1 and the opposite substrate 200.

In an embodiment, the wave plate is an optical device made by a birefringent material. The wave plate includes, for instance, a fast axis and a slow axis orthogonal to each other. In the wave plate, the indices of refraction along a direction of the fast axis and a direction of the slow axis are different, and the speed of light transmission parallel to the fast axis is greater than that parallel to the slow axis. Therefore, after light passes through the wave plate, a certain phase difference exists between the light parallel to the fast axis and the light parallel to the slow axis. In an embodiment, a phase difference of half a wavelength occurs when light passes through the first optical film PL1. In an embodiment, a phase difference of a quarter wavelength occurs when light passes through the second optical film PL2.

In an embodiment, the angle between the alignment direction D0 and a first slow axis A1 of the first optical film PL1 is substantially 60 degrees. A second slow axis A2 of the second optical film PL2 is substantially parallel to the alignment direction D0. In an embodiment, the angle between the second slow axis A2 and the first slow axis A1 is substantially 60 degrees.

The first polarized pattern layer 10 is located on the first optical film PL1. In the present embodiment, the first optical film PL1 is located between the first polarized pattern layer 10 and the second optical film PL2, and therefore the dark state quality of the display panel can be effectively improved, and brightness of the dark state of lights having a short wavelength and lights having a long wavelength passing through the display panel can each be reduced by 60% to 88%, and contrast can be increased as a result. The first polarized pattern layer 10 includes a first upper polarized pattern 12, a second upper polarized pattern 14, and a third upper polarized pattern 16. In an embodiment, the first upper polarized pattern 12, the second upper polarized pattern 14, and the third upper polarized pattern 16 are, for instance, formed at the same time using a nanoimprint technique.

In some embodiments, the dark state quality of the display panel is improved from the first polarized pattern layer 10, the first optical film PL1, and the second optical film PL2. For instance, the extending direction of the metal wires L2, L4, and L6 in the first polarized pattern layer 10 and the direction of the first slow axis A1 and the direction of the second slow axis A2 are adjusted such that the display panel has better dark state quality.

The first upper polarized pattern 12 is disposed in correspondence to the first filter pattern R and includes a plurality of metal wires L2 arranged along a first direction D1, wherein the metal wires L2 of the first upper polarized pattern 12 are extended along an extending direction T1. In an embodiment, the absorption axis of the first upper polarized pattern 12 is substantially perpendicular to the first direction D1 and substantially parallel to the extending direction T1. In an embodiment, the angle between the first direction D1 and the alignment direction D0 of the alignment layer 120 is −78 degrees to −76 degrees or 12 degrees to 14 degrees, wherein −77 degrees is preferred in the present embodiment. In an embodiment, the angle between the extending direction T1 (such as the direction parallel to the absorption axis of the first upper polarized pattern 12) and the first slow axis A1 of the first optical film PL1 is 72 degrees to 74 degrees or 162 degrees to 164 degrees, wherein 73 degrees is preferred in the present embodiment.

The second upper polarized pattern 14 is disposed in correspondence to the second filter pattern G and includes a plurality of metal wires L4 arranged along a second direction D2, wherein the metal wires L4 of the second upper polarized pattern 14 are extended along an extending direction T2. In an embodiment, the absorption axis of the second upper polarized pattern 14 is substantially perpendicular to the second direction T2 and substantially parallel to the extending direction T2. In an embodiment, the angle between the second direction D2 and the alignment direction D0 is 14 degrees to 16 degrees, wherein 15 degrees is preferred in the present embodiment. In an embodiment, the angle between the extending direction T2 (such as the direction parallel to the absorption axis of the second upper polarized pattern 14) and the first slow axis A1 of the first optical film PL1 is 164 degrees to 166 degrees, wherein 165 degrees is preferred in the present embodiment.

The third upper polarized pattern 16 is disposed in correspondence to the third filter pattern B and includes a plurality of metal wires L6 arranged along a third direction D3, wherein the metal wires L6 of the third upper polarized pattern 16 are extended along an extending direction T3. In an embodiment, the absorption axis of the third upper polarized pattern 16 is substantially perpendicular to the third direction D3 and substantially parallel to the extending direction T3. In an embodiment, the angle between the third direction D3 and the alignment direction D0 is −79 degrees to −75 degrees or 10 degrees to 15 degrees, wherein 12 degrees is preferred in the present embodiment. In an embodiment, the angle between the extending direction T3 (such as direction parallel to the absorption axis of the third upper polarized pattern 16) and the first slow axis A1 of the first optical film PL1 is 71 degrees to 75 degrees or 160 degrees to 165 degrees, wherein 162 degrees is preferred in the present embodiment.

In an embodiment, the angle between the second direction D2 and the first direction D1 and/or the first direction D1 and the third direction D3 is greater than 60 degrees. In the present embodiment, the angle between the second direction D2 and the first direction D1 is greater than 60 degrees. In an embodiment, the first direction D1, the second direction D2, and the third direction D3 are not the same direction. For instance, one of the first direction D1, the second direction D2, and the third direction D3 is different from the other two. In other words, the first direction D1, the second direction D2, and the third direction D3 include two or more directions.

In an embodiment, gaps W1 between the metal wires L2, between the metal wires L4, and between the metal wires L6 in the first polarized pattern layer 10 is substantially the same. For instance, the gaps W1 between the metal wires L2, between the metal wires L4, and between the metal wires L6 of the first upper polarized pattern 12, the second upper polarized pattern 14, and the third upper polarized pattern 16 respectively are substantially the same, and are, for instance, about 1 nm to 150 nm. In an embodiment, linewidths W2 of the metal wires L2, L4, and L6 in the first polarized pattern layer 10 are substantially the same. For instance, the linewidths W2 of the metal wires L2, L4, and L6 of the first upper polarized pattern 12, the second upper polarized pattern 14, and the third upper polarized pattern 16 respectively are substantially the same, and are, for instance, about 1 nm to 150 nm.

Based on the above, the display panel of the invention has a first upper polarized pattern 12, a second upper polarized pattern 14, and a third upper polarized pattern 16. The first upper polarized pattern 12, the second upper polarized pattern 14, and the third upper polarized pattern 16 include two or more absorption axes of different directions, and therefore the contrast of lights of different wavebands can be increased and dark state quality of the display panel can be improved.

Figure 2:
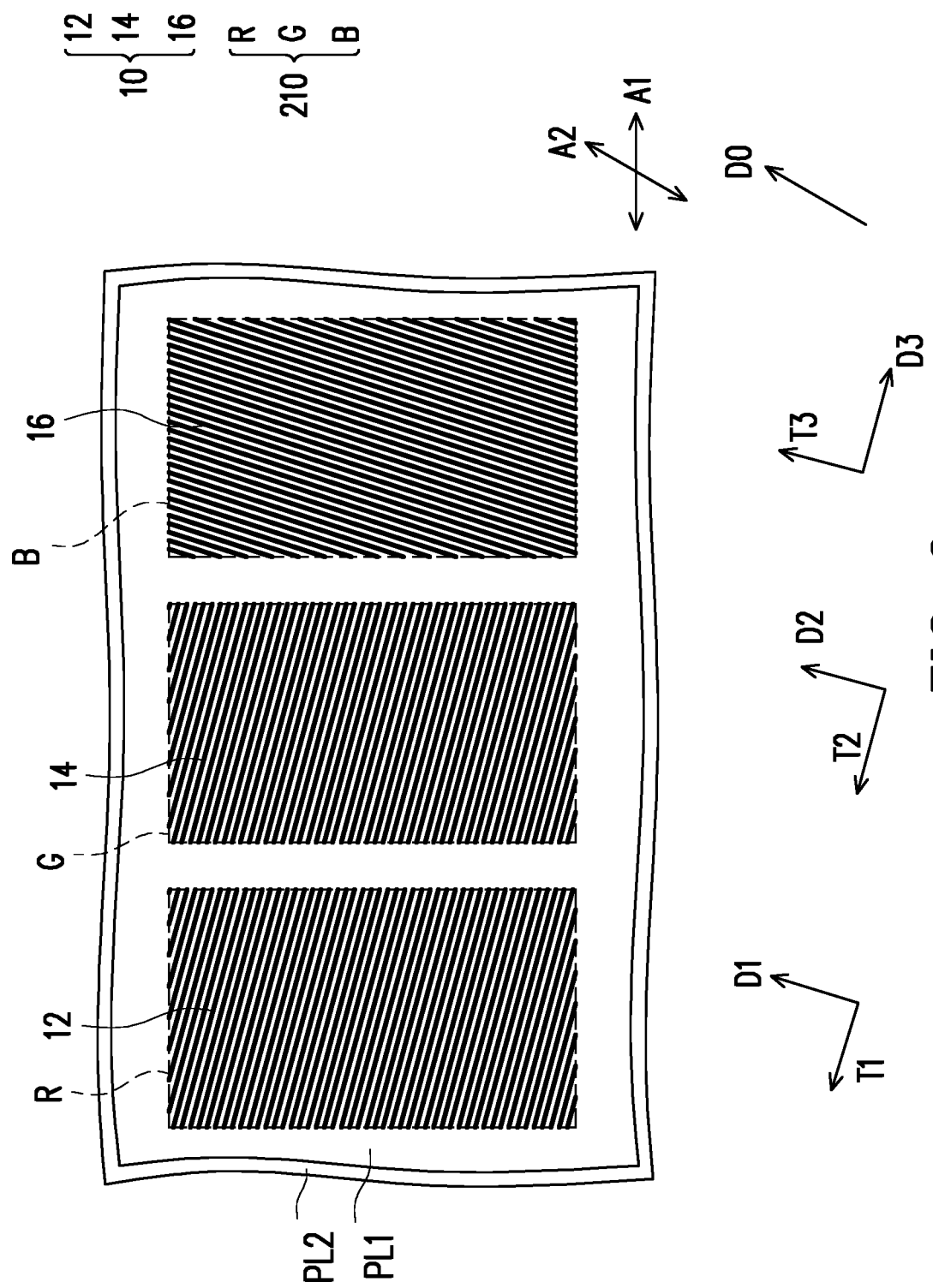
FIG. 2 is a top view of a display panel according to an embodiment of the invention.

FIG. 2 is a top view of a display panel according to an embodiment of the invention. It should be mentioned here that, the embodiment of FIG. 2 adopts the reference numerals of the embodiment of FIG. 1A and FIG. 1B and a portion of the contents thereof, wherein the same or similar numerals are used to represent the same or similar devices and descriptions of the same technical contents are omitted. The omitted portions are described in the previous embodiments and are not repeated in the following embodiments.

The main difference between the embodiment of FIG. 2 and the embodiment of FIG. 1A and FIG. 1B is: in the embodiment of FIG. 2, the angle between the first direction D1 of the first upper polarized pattern 12 and the alignment direction D0 is 12 degrees to 14 degrees, and the angle between the third direction D3 of the third upper polarized pattern 16 and the alignment direction D0 is −79 degrees to −75 degrees.

In the present embodiment, the angle between the first direction D1 and the alignment direction D0 is 12 degrees to 14 degrees, wherein 13 degrees is preferred. In an embodiment, the angle between the extending direction T1 (such as the direction parallel to the absorption axis of the first upper polarized pattern 12) and the first slow axis A1 of the first optical film PL1 is 162 degrees to 164 degrees, wherein 163 degrees is preferred.

In the present embodiment, the angle between the third direction D3 and the alignment direction D0 is −79 degrees to −75 degrees, wherein −77 degrees is preferred in the present embodiment. In an embodiment, the angle between the extending direction T3 (such as the direction parallel to the absorption axis of the third upper polarized pattern 16)

and the first slow axis A1 of the first optical film PL1 is 71 degrees to 75 degrees, wherein 73 degrees is preferred in the present embodiment.

Based on the above, the display panel of the invention has a first upper polarized pattern 12, a second upper polarized pattern 14, and a third upper polarized pattern 16. The first upper polarized pattern 12, the second upper polarized pattern 14, and the third upper polarized pattern 16 include two or more absorption axes of different directions, and therefore the contrast of lights of different wavebands can be increased and dark state quality of the display panel can be improved.

Figure 3:
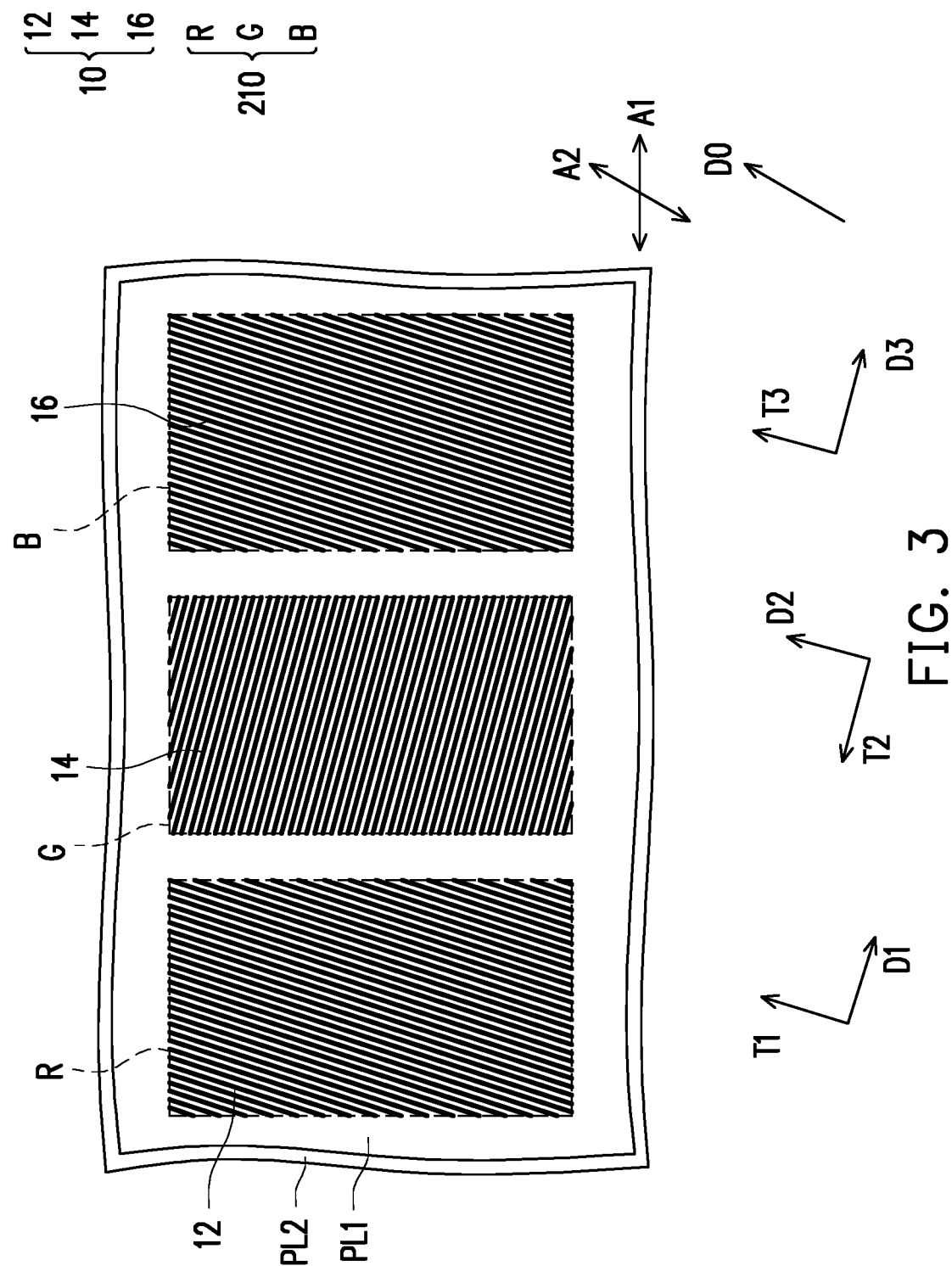
FIG. 3 is a top view of a display panel according to an embodiment of the invention.

FIG. 3 is a top view of a display panel according to an embodiment of the invention. It should be mentioned here that, the embodiment of FIG. 3 adopts the reference numerals of the embodiment of FIG. 1A and FIG. 1B and a portion of the contents thereof, wherein the same or similar numerals are used to represent the same or similar devices and descriptions of the same technical contents are omitted. The omitted portions are described in the previous embodiments and are not repeated in the following embodiments.

The main difference between the embodiment of FIG. 3 and the embodiment of FIG. 1A and FIG. 1B is: in the embodiment of FIG. 3, the angle between the third direction D3 of the third upper polarized pattern 16 and the alignment direction D0 is −79 degrees to −75 degrees.

In the present embodiment, the angle between the third direction D3 and the alignment direction D0 is −79 degrees to −75 degrees. In an embodiment, the angle between the extending direction T3 (such as the direction parallel to the absorption axis of the third upper polarized pattern 16) and the first slow axis A1 of the first optical film PL1 is 71 degrees to 75 degrees.

Based on the above, the display panel of the invention has a first upper polarized pattern 12, a second upper polarized pattern 14, and a third upper polarized pattern 16. The first upper polarized pattern 12, the second upper polarized pattern 14, and the third upper polarized pattern 16 include two or more absorption axes of different directions, and therefore the contrast of lights of different wavebands can be increased and dark state quality of the display panel can be improved.

Figure 4A:
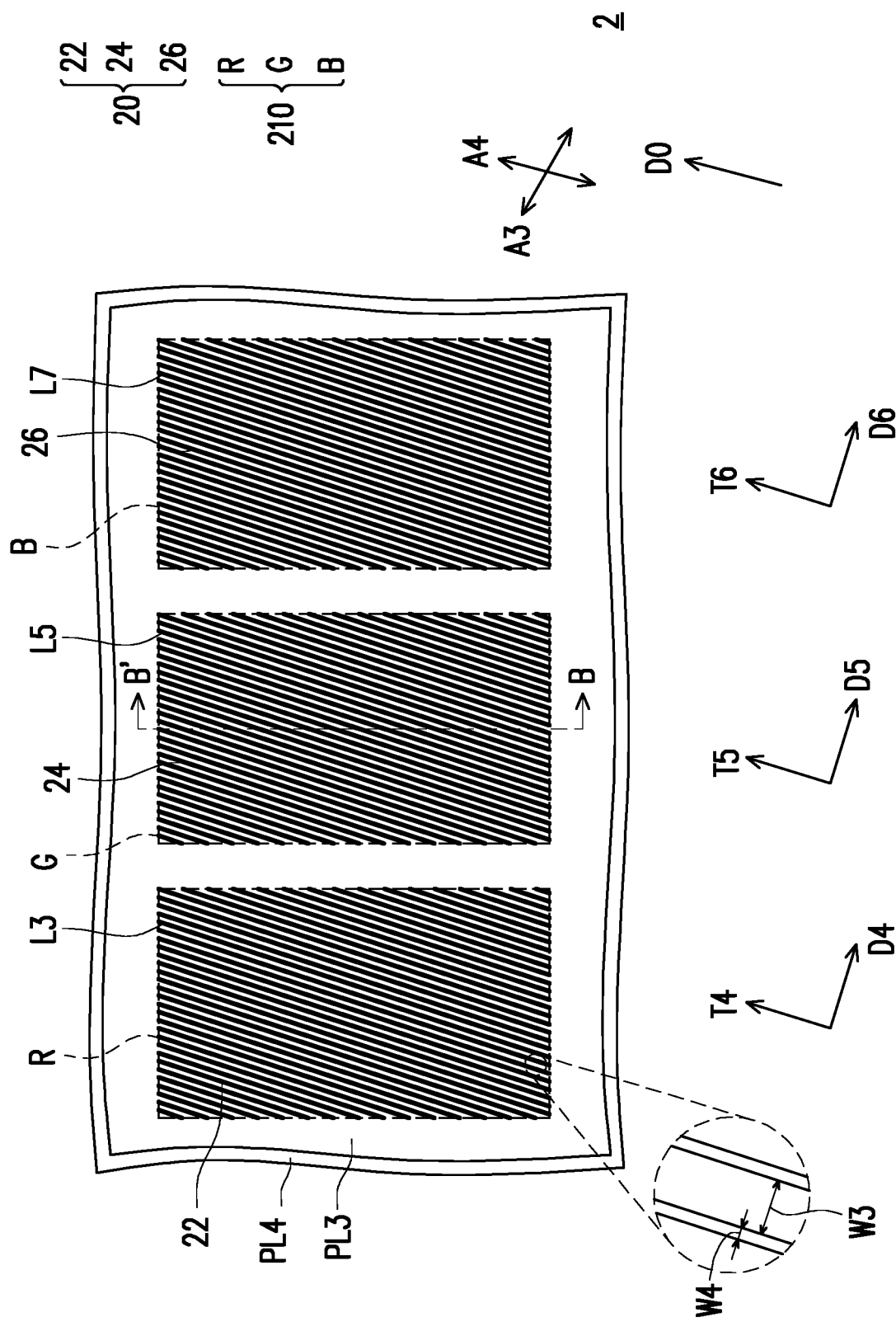
FIG. 4A is a bottom view of a display panel according to an embodiment of the invention.
Figure 4B:
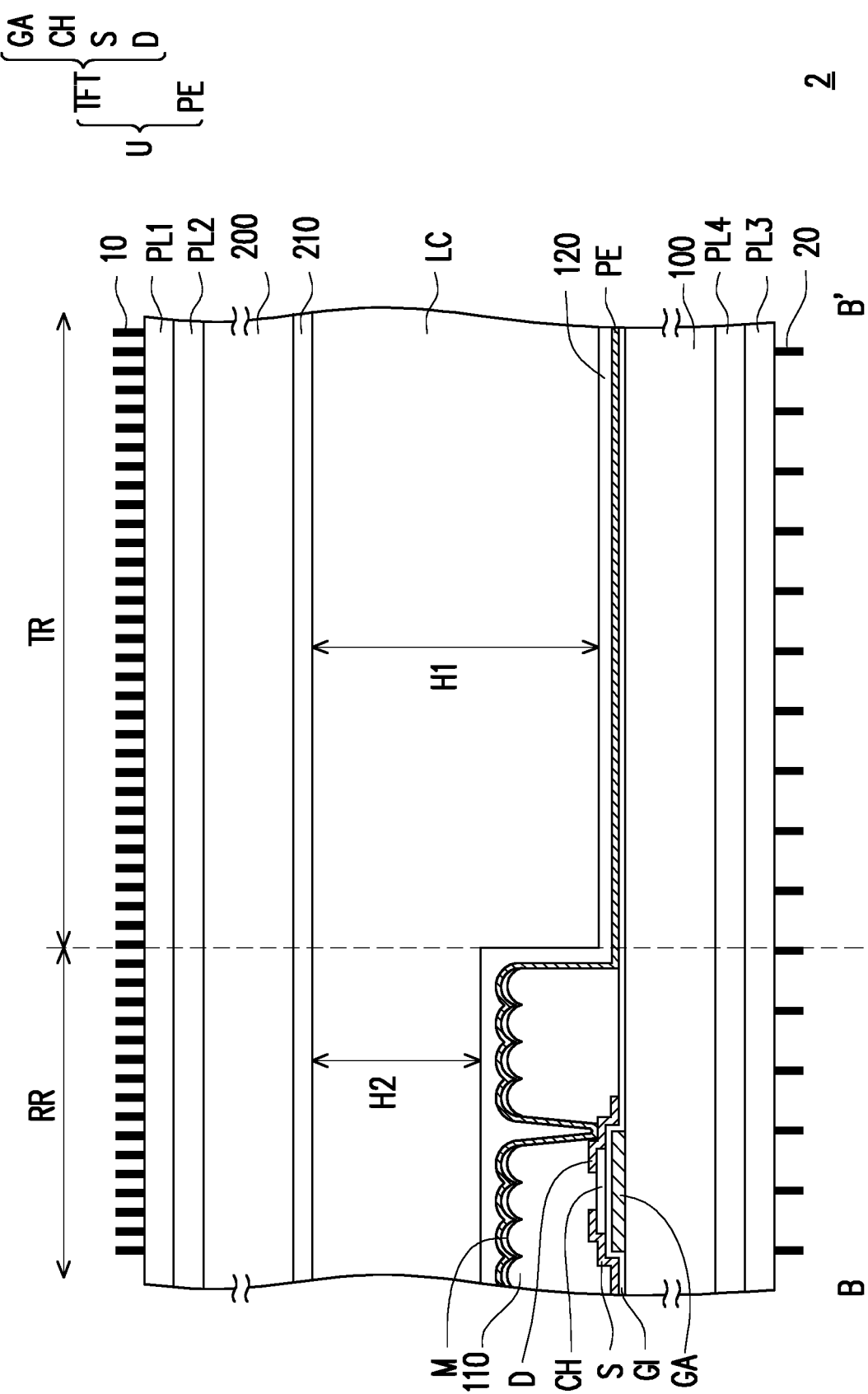
FIG. 4B is a cross section along section line BB' of FIG. 4A.

FIG. 4A is a bottom view of a display panel according to an embodiment of the invention. FIG. 4B is a cross section along section line BB' of FIG. 4A. It should be mentioned here that, the embodiment of FIG. 4A and FIG. 4B adopts the reference numerals of the embodiment of FIG. 1A and FIG. 1B and a portion of the contents thereof, wherein the same or similar numerals are used to represent the same or similar devices and descriptions of the same technical contents are omitted. The omitted portions are described in the previous embodiments and are not repeated in the following embodiments.

The main difference between the embodiment of FIG. 4A and FIG. 4B and the embodiment of FIG. 1A and FIG. 1B is: in the embodiment of FIG. 4A and FIG. 4B, the display panel includes a third optical film PL3, a fourth optical film PL4, and a second polarized pattern layer 20 located at a side on the active device substrate 100 opposite to the liquid crystal layer LC.

In the present embodiment, a display panel 2 includes an active device substrate 100, an opposite substrate 200, a liquid crystal layer LC, a color filter layer 210, a first polarized pattern layer 10, and a second polarized pattern layer 20.

The opposite substrate 200 is disposed opposite to the active device substrate 100. The liquid crystal layer LC is disposed between the active device substrate 100 and the opposite substrate 200. The color filter layer 210 is disposed between the active device substrate 100 and the opposite substrate 200. The color filter layer 210 includes a first filter pattern R, a second filter pattern G, and a third filter pattern B. The first polarized pattern layer 10 is located on the color filter layer 210. The first polarized pattern layer 10 includes a first upper polarized pattern 12, a second upper polarized pattern 14, and a third upper polarized pattern 16. The first upper polarized pattern 12 is disposed in correspondence to the first filter pattern R and includes a plurality of metal wires L2 arranged along a first direction D1. The second upper polarized pattern 14 is disposed in correspondence to the second filter pattern G and includes a plurality of metal wires L4 arranged along a second direction D2. The third upper polarized pattern 16 is disposed in correspondence to the third filter pattern B and includes a plurality of metal wires L6 arranged along a third direction D3. The first direction D1, the second direction D2, and the third direction D3 are not the same direction and a possible configuration thereof is provided in the embodiments above and is not repeated herein.

The third optical film PL3 is, for instance, a λ/2 wave plate located at a side of the active device substrate 100 opposite to the liquid crystal layer LC. The fourth optical film PL4 is, for instance, a λ/4 wave plate located between the third optical film PL3 and the active device substrate 100. In an embodiment, a phase difference of half a wavelength occurs when light passes through the third optical film PL3. In an embodiment, a phase difference of a quarter wavelength occurs when light passes through the fourth optical film PL4.

In an embodiment, the angle between the third slow axis A3 of the third optical film PL3 and the alignment direction D0 is substantially 75 degrees. In an embodiment, the angle between the third slow axis A3 of the third optical film PL3 and the first slow axis A1 of the first optical film PL1 is substantially 135 degrees. The fourth slow axis A4 of the fourth optical film PL4 is substantially parallel to the alignment direction D0. In an embodiment, the angle between the fourth slow axis A4 of the fourth optical film PL4 and the third slow axis A3 of the third optical film PL3 is substantially −75 degrees. In an embodiment, the fourth slow axis A4 of the fourth optical film PL4 and the second slow axis A2 of the second optical film PL2 are substantially parallel.

The second polarized pattern layer 20 is located on the third optical film PL3. In an embodiment, the third optical film PL3 is located between the second polarized pattern layer 20 and the fourth optical film PL4, and therefore the dark state quality of the display panel can be effectively improved, and dark state brightness of light having a short wavelength and light having a long wavelength passing through the display panel can each be reduced by 5% to 15%, and contrast can be increased as a result. In an embodiment, the second polarized pattern layer 20 is at least overlapped with the transmission region TR of the sub-pixels U. The second polarized pattern layer 20 includes a first lower polarized pattern 22, a second lower polarized pattern 24, and a third lower polarized pattern 26. In an embodiment, the first lower polarized pattern 22, the second lower polarized pattern 24, and the third lower polarized pattern 26 are, for instance, formed at the same time using a nanoimprint technique.

In some embodiments, the dark state quality of the display panel is improved by disposing the second polarized pattern layer 20, the third optical film PL3, and the fourth optical film PL4. For instance, the direction of the metal wires L3, L5, and L7 in the second polarized pattern layer 20 and the direction of the third slow axis A3 and the direction of the fourth slow axis A4 are adjusted such that the display panel has better dark state quality.

The first lower polarized pattern 22 is disposed in correspondence to the first filter pattern R and includes a plurality of metal wires L3 arranged along a fourth direction D4, wherein the metal wires L3 of the first lower polarized pattern 22 are extended along an extending direction T4. In an embodiment, the absorption axis of the first lower polarized pattern 22 is substantially perpendicular to the fourth direction D4 and substantially parallel to the extending direction T4. In an embodiment, the angle between the fourth direction D4 and the alignment direction D0 is −77 degrees to −76 degrees, wherein −76 degrees is preferred. In an embodiment, the angle between the extending direction T4 (such as the direction parallel to the absorption axis of the first lower polarized pattern 22) and the first slow axis A1 of the first optical film PL1 is 73 degrees to 74 degrees, wherein 74 degrees is preferred.

In an embodiment, the vertical projections of the first upper polarized pattern 12, the first lower polarized pattern 22, and the first filter pattern R on the active device substrate 100 are overlapped, and the extending direction T1 of the metal wires L2 of the first upper polarized pattern 12 can substantially be parallel or perpendicular to the extending direction T4 of the metal wires L3 of the first lower polarized pattern 22, wherein parallel refers to an angle therebetween is −1 to 1 degrees, and vertical refers to an angle therebetween is 89 and 91 degrees.

The second lower polarized pattern 24 is disposed in correspondence to the second filter pattern G and includes a plurality of metal wires L5 arranged along a fifth direction D5, wherein the metal wires L5 of the second lower polarized pattern 24 are extended along an extending direction T5. In an embodiment, the absorption axis of the second lower polarized pattern 24 is substantially perpendicular to the fifth direction D5 and substantially parallel to the extending direction T5. In an embodiment, the angle between the fifth direction D5 and the alignment direction D0 is −73 degrees to −77 degrees, wherein −75 degrees is preferred. In an embodiment, the angle between the extending direction T5 (such as the direction parallel to the absorption axis of the second lower polarized pattern 24) and the first slow axis A1 of the first optical film PL1 is 73 degrees to 77 degrees, wherein 75 degrees is preferred in the present embodiment.

In an embodiment, the vertical projections of the second upper polarized pattern 14, the second lower polarized pattern 24, and the second filter pattern G on the active device substrate 100 are overlapped, and the extending direction T2 of the metal wires L4 of the second upper polarized pattern 14 is substantially perpendicular to the extending direction T5 of the metal wires L5 of the second lower polarized pattern 24.

The third lower polarized pattern 26 is disposed in correspondence to the third filter pattern B and includes a plurality of metal wires L7 arranged along a sixth direction D6, wherein the metal wires L7 of the third lower polarized pattern 26 are extended along an extending direction T6. In an embodiment, the absorption axis of the third lower polarized pattern 26 is substantially perpendicular to the sixth direction D6 and substantially parallel to the extending direction T6. In an embodiment, the angle between the sixth direction D6 and the alignment direction D0 is −79 degrees to −76 degrees, wherein −77 degrees is preferred. In an embodiment, the angle between the extending direction T6 (such as the direction parallel to the absorption axis of the third lower polarized pattern 26) and the first slow axis A1 of the first optical film PL1 is 71 degrees to 74 degrees, wherein 73 degrees is preferred.

In an embodiment, the vertical projections of the third upper polarized pattern 16, the third lower polarized pattern 26, and the third filter pattern B on the active device substrate 100 are overlapped, and the extending direction T3 of the metal wires L6 of the third upper polarized pattern 16 is substantially parallel or perpendicular to the extending direction T6 of the metal wires L7 of the third lower polarized pattern 26.

In an embodiment, the fourth direction D4, the fifth direction D5, and the sixth direction D6 are not the same direction. For instance, one of the fourth direction D4, the fifth direction D5, and the sixth direction D6 is different from the other two. In other words, the fourth direction D4, the fifth direction D5, and the sixth direction D6 include two or more directions.

In an embodiment, gaps W3 between the metal wires L3, between the metal wires L5, and between the metal wires L7 in the second polarized pattern layer 20 are substantially the same. For instance, the gaps W3 between the metal wires L3, between the metal wires L5, and between the metal wires L7 of the first lower polarized pattern 22, the second lower polarized pattern 24, and the third lower polarized pattern 26 respectively are substantially the same, and are, for instance, about 1 nm to 150 nm. In an embodiment, linewidths W4 of the metal wires L3, L5, and L7 in the second polarized pattern layer 20 are substantially the same. For instance, the linewidths W4 of the metal wires L3, L5, and L7 of the first lower polarized pattern 22, the second lower polarized pattern 24, and the third lower polarized pattern 26 respectively are substantially the same, and are, for instance, about 1 mm to 150 mm. In an embodiment, the gaps W1 of the metal wires L2, L4, and L6 in the first polarized pattern layer 10 and the gaps W3 of the metal wires L3, L5, and L7 in the second polarized pattern layer 20 are substantially the same. In an embodiment, the linewidths W2 of the metal wires L2, L4, and L6 in the first polarized pattern layer 10 and the linewidths W4 of the metal wires L3, L5, and L7 in the second polarized pattern layer 20 are substantially the same.

Based on the above, the display panel of the invention has a first lower polarized pattern 22, a second lower polarized pattern 24, and a third lower polarized pattern 26. The first lower polarized pattern 22, the second lower polarized pattern 24, and the third lower polarized pattern 26 include two or more absorption axes of different directions, and therefore the contrast of lights of different wavebands passing through the display panel can be further increased and dark state quality of the display panel can be improved.

Based on the above, the display panel of the invention has a first upper polarized pattern, a second upper polarized pattern, and a third upper polarized pattern. The first upper polarized pattern, the second upper polarized pattern, and the third upper polarized pattern include two or more absorption axes of different directions, and therefore the contrast of lights of different wavebands can be increased and dark state quality of the display panel can be improved. In an embodiment, the display panel of the invention further includes a first lower polarized pattern, a second lower polarized pattern, and a third lower polarized pattern overlapped with a transmission region and the contrast between lights of different wavebands passing through the display panel can be further increased. In an embodiment, a λ/2 wave plate is located between a polarized pattern layer and a λ/4 wave plate, and therefore the dark state quality of the display panel can be effectively improved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display panel, comprising:
an active device substrate;
an opposite substrate disposed opposite to the active device substrate;
a liquid crystal layer disposed between the active device substrate and the opposite substrate;
a color filter layer located between the active device substrate and the opposite substrate, wherein the color filter layer comprises a first filter pattern, a second filter pattern, and a third filter pattern, wherein the second filter pattern is adjacent to the first filter pattern and the third filter pattern;
a first polarized pattern layer located above the color filter layer;
wherein the first polarized pattern layer comprises:
a first upper polarized pattern disposed in correspondence to the first filter pattern and comprising a plurality of metal wires arranged along a first direction;
a second upper polarized pattern disposed in correspondence to the second filter pattern and comprising a plurality of metal wires arranged along a second direction; and
a third upper polarized pattern disposed in correspondence to the third filter pattern and comprising a plurality of metal wires arranged along a third direction,
wherein the first direction, the second direction, and the third direction are not the same direction, wherein an angle between the second direction and one of the first direction and the third direction is greater than 60 degrees,
an alignment layer located on the active device substrate, wherein the alignment layer has an alignment direction;
a first optical film located at a side of the opposite substrate opposite to the liquid crystal layer; and
a second optical film located between the first optical film and the opposite substrate,
wherein the first optical film has a first slow axis, and an angle between the alignment direction and the first slow axis is substantially 60 degrees, and
the second optical film has a second slow axis, and the second slow axis and the alignment direction are substantially parallel.

2. The display panel of claim 1, wherein the active device substrate has a plurality of sub-pixels, and at least a portion of each of the plurality of sub-pixels has a reflective region.

3. The display panel of claim 1, wherein
the first optical film is a $\lambda/2$ wave plate,
the second optical film is a $\lambda/4$ wave plate, and
the first optical film is located between the first polarized pattern layer and the second optical film.

4. The display panel of claim 1, wherein an angle between the first direction and the alignment direction is −78 degrees to −76 degrees or 12 degrees to 14 degrees.

5. The display panel of claim 1, wherein an angle between the third direction and the alignment direction is −79 degrees to −75 degrees or 10 degrees to 15 degrees.

6. The display panel of claim 1, wherein
an angle between the second direction and the alignment direction is 14 degrees to 16 degrees.

7. The display panel of claim 1, wherein each of the plurality of sub-pixels of the active device substrate further has a transmission region adjacent to the reflective region, a first gap exists between the transmission region and the opposite substrate, a second gap exists between the reflective region and the opposite substrate, and the first gap is greater than the second gap.

8. The display panel of claim 7, further comprising:
a second polarized pattern layer located at a side of the active device substrate opposite to the liquid crystal layer, wherein the second polarized pattern layer comprises:
a first lower polarized pattern disposed in correspondence to the first filter pattern and comprising a plurality of metal wires arranged along a fourth direction;
a second lower polarized pattern disposed in correspondence to the second filter pattern and comprising a plurality of metal wires arranged along a fifth direction; and
a third lower polarized pattern disposed in correspondence to the third filter pattern and comprising a plurality of metal wires arranged along a sixth direction,
wherein the fourth direction, the fifth direction, and the sixth direction are not the same direction.

9. The display panel of claim 8, further comprising:
a third optical film located at the side of the active device substrate opposite to the liquid crystal layer; and
a fourth optical film located between the third optical film and the active device substrate.

10. The display panel of claim 9, wherein
the third optical film is a $\lambda/2$ wave plate,
the fourth optical film is a $\lambda/4$ wave plate, and
the third optical film is located between the second polarized pattern layer and the fourth optical film.

11. The display panel of claim 8, wherein an angle between the fourth direction and the alignment direction is −77 degrees to −76 degrees.

12. The display panel of claim 8, wherein an angle between the sixth direction and the alignment direction is −79 degrees to −76 degrees.

13. The display panel of claim 9, wherein:
the third optical film has a third slow axis, and an angle between the third slow axis and the alignment direction is substantially 75 degrees,
the fourth optical film has a fourth slow axis, and the fourth slow axis and the alignment direction are substantially parallel, and
an angle between the fifth direction and the alignment direction is −73 degrees to −77 degrees.

14. The display panel of claim 8, wherein:
gaps between the plurality of metal wires of the first polarized pattern layer or gaps between the plurality of metal wires of the second polarized pattern layer are substantially the same.

15. The display panel of claim 8, wherein:
linewidths of the plurality of metal wires of the first polarized pattern layer or linewidths of the plurality of metal wires of the second polarized pattern layer are substantially the same.

16. The display panel of claim 1, wherein:
the first filter pattern is a red filter pattern,
the second filter pattern is a green filter pattern, and
the third filter pattern is a blue filter pattern.

* * * * *